Oct. 26, 1943.  J. A. GRABEC  2,332,848
STRETCHABLE LAMINATED FABRIC AND MANUFACTURE OF SAME
Filed Aug. 6, 1938
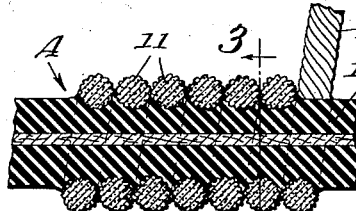
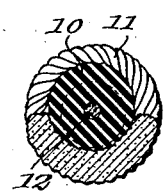
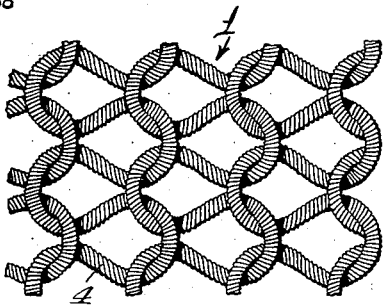
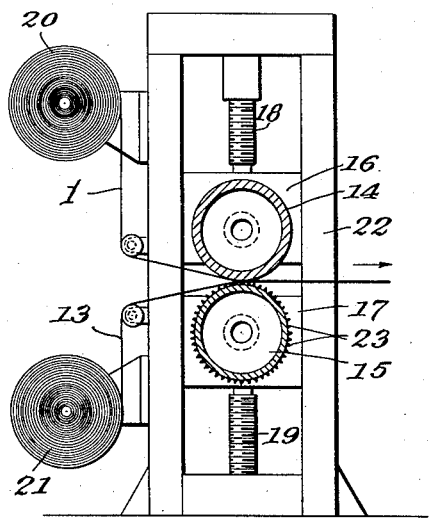
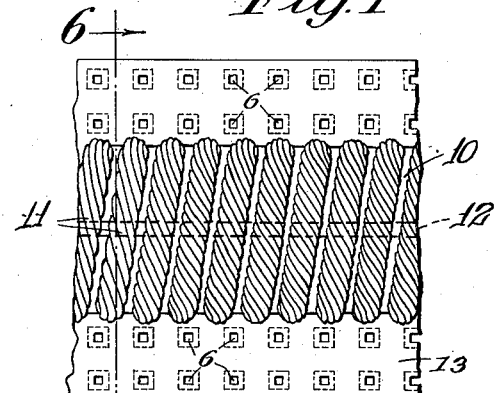
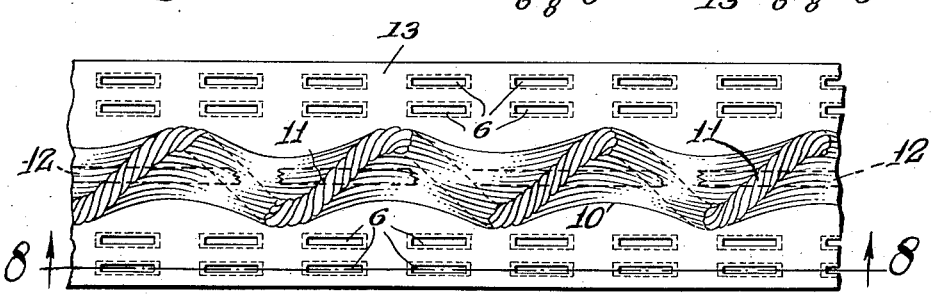
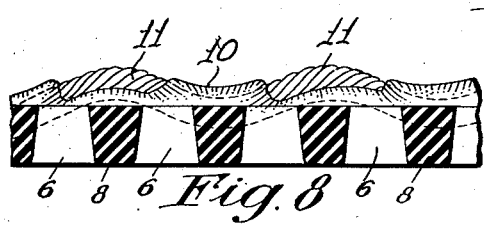
Inventor:
Josef A. Grabec
By Theodore C. Brown
Attorney Patented Oct. 26, 1943

2,332,848

UNITED STATES PATENT OFFICE 2,332,848

STRETCHABLE LAMINATED FABRIC AND MANUFACTURE OF SAME

Josef A. Grabec, Bratislava, Czechoslovakia; vested in the Alien Property Custodian Application August 6, 1938, Serial No. 223,474
In Austria August 19, 1937

6 Claims. (Cl. 154—2)

This invention relates to composite extensible sheet material and particularly to laminated sheet material which includes a layer of elastic material such as rubber or its equivalents and a layer of stretchable elastic textile material. The material of this invention is particularly suitable for use in articles of clothing such as bathing suits, corsets, girdles, surgical bandages and stockings and other constrictive apparel.

In producing sheets of extensible composite material suitable for use in corsets, bathing suits, etc., it has been proposed to combine the rubber and a textile reenforcement into a composite sheet by pressure molding the rubber while in its uncured state into and around the strands of the reenforcing textile material; when the reenforcing textile is a knitted fabric the distortion permitted by the loop arrangement of the stitches gives a certain limit of extensibility. When the loops of the stitches have been drawn out to their full extent, the inextensible character of the threads restrains all further stretch of the rubber in the sheet. Although this limited extensibility is sufficient for many purposes, it is not uniform since under normal conditions the composite fabric may be stretched much further in the direction along the loops of the stitches than across the loops.

By my present invention, I provide a fabric reenforcement for the composite sheet which permits free extensibility equally in all directions but imposes a restraint upon the further stretching of the sheet at any predetermined elongation.

It is the primary aim and object of the present invention to produce a reenforced rubber fabric which is freely extensible in all directions.

Another object of the invention is to produce a composite rubber fabric reenforced in such a way that danger of stretching the rubber beyond a predetermined safe elongation in normal use is obviated.

Still another object of the invention is to combine the reenforcement with the rubber in a permanent manner so that separations between the rubber and the reenforcing elements will not occur in any normal use of articles made from the composite fabric.

Other objects of the invention will become apparent in the course of the following specification and from the drawing forming a part thereof, in which Fig. 1 shows a textile fabric which forms one ply of the composite fabric;

Fig. 2 is a longitudinal cross-sectional view of an individual thread of the fabric of Figure 1;

Fig. 3 is a transverse cross-sectional view of the thread taken along line 3—3 of Fig. 2;

Fig. 4 is a vertical cross-sectional view of a machine which may be used in forming the composite material;

Fig. 5 is a plan view of the completed composite material as it appears from the fabric side, showing a single thread, to an enlarged scale;

Fig. 6 is a section on line 6—6, Fig. 5;

Fig. 7 is similar to Fig. 5 but shows the material in stretched condition; and

Fig. 8 is a section on line 8—8 of Figure 7.

In carrying out my invention, I first prepare the fabric 1, Fig. 1, from a textile-covered, rubber-cored thread 4 by knitting, weaving, netting or other appropriate textile operation.

Subject to modifications which I shall describe later an essential element of my invention is a thread, suitable for use in making this fabric, comprising a core 10 (Figures 2 and 3) of unvulcanized rubber and a helically wound fibrous covering formed by tightly winding a filament 11 about the core. Preferably, the core is treated in a known manner to render it substantially inextensible throughout the operations of winding on the covering and weaving or knitting so that a helix of uniform diameter will be made and the tension properly maintained during the fabric forming operations. When a fabric has been manufactured from the wound thread, it is treated to remove the stiffening substance, if it is by this means that the thread has been rendered inextensible. Or, if the thread is rendered inextensible by an inner core of cotton, rayon, cellulose acetate, etc., which is intended to be destructible or broken by wearing strains no further processing after manufacture of the fabric is necessary. The wrapping filament may be impregnated with rubber latex before wrapping to improve its adhesion to the core.

It is not strictly necessary, however, that the core be of unvulcanized rubber. It is quite possible to utilize a fully vulcanized core provided that the plasticity of the gum sheet would be sufficient to enfold the individual turns of the helix under the combining pressure during the laminating operation or if the thread first be drawn through a rubber solution or dispersion or the completed fabric first coated with latex or rubber cement. In such a case the union of the helical reenforcement with the sheet is sufficiently secured. The use of a fully vulcanized core, however, introduces difficulties into the laminating operation since with such a core the vulcanizing conditions must be controlled with greater care if uniform extensibility of the rubber of the cores and of the sheet is to be secured.

It is desirable in making composite fabric for some uses to provide the filament-covered core with a coating of rubber, formed either from a latex cement or a rubber solution. This aftercoating more securely bonds the convolutions of the thread to the core, prevents any broken threads from working loose from the rubber base and in many instances improves the thread.

In the embodiment selected for illustration, the core is rendered inextensible by a continuous textile thread 12, embedded within the core 10. This reenforced core may be formed by running a suitable thread, such as an ordinary twisted textile thread of cotton or rayon, impregnated with suitable coagulating agents if desired, through a bath of latex so that it picks up a coating of uncured rubber as it emerges from the bath. The complete coating may be effected in one or more passes through the bath, depending upon the conditions. The thread obviously may be embedded within the core in other manners, as by deforming the core about the thread, or, it may be laid externally of the core within the helical wrapping.

A design may be woven into the fabric if desired.

I next prepare a sheet 13 of unvulcanized rubber compound of thickness appropriate to the use intended for the finished article by use of any of the sheeting operations well known in the art.

The fabric 1 is now permanently associated with the rubber sheet 13 to form the composite fabric of my invention. This operation is to be carried out in such a way that the rubber of the thread cores 10 and the rubber of the sheet 13 become integrally united and so that the helical covering of the threads is partially embedded below the general level of the surface of the rubber sheet, as illustrated in Fig. 6 of the drawing. This step may conveniently be carried out by the use of pressure at a temperature sufficiently high to render the rubber of both the cores and sheet plastic. The pressure should be sufficient to cause plastic flow of the rubber so that the rubber of the sheet flows up around and embeds a considerable proportion of each turn of the helix of thread surrounding the rubber core and so that the rubber of the core flows down between the successive turns of the helix of thread and fuses inseparably into the mass of the rubber sheet.

The rubber sheet 13 and the fabric 1 are preferably combined in a continuous operation. Mechanism suitable for this purpose is illustrated in Fig. 4. A pair of pressure rolls 14, 15 are supported for adjustment toward and from each other on bearing members 16 and 17 respectively. These bearing members are held in adjusted position by adjusting screws 18 and 19. Provision is made for heating the rolls 14, 15 as by circulating steam or water through them. Roll 15 is provided with projections 23 distributed over its surface for a purpose which will become apparent presently. The fabric and the rubber sheet are fed continuously between the rollers, from rolls 20, 21 supported on the machine frame 22. If it is more convenient to do so either or both of the webs may be fed into the machine directly from the machine on which it is formed.

The material may pass through the rolls at such a rate that it is completely vulcanized during the combining operation, but, preferably, and in order to increase the speed of the process, I cause the materials to pass through the combining rolls at such a speed that the process of vulcanization is only partially complete. Thereafter, the material passes through a heated tunnel where the vulcanization is completed. It should be noticed that the textile reenforcement is now a series of helical strands 11 partially embedded in the rubber and that the rubber cores 10 of the original threads 4 have, as such, practically entirely disappeared. This practice demands that the characteristics of the cured core and the cured rubber sheet shall be nearly identical so that the extensibility of the rubber will be uniform in the finished product.

Since the successive turns of the helix reenforcement are now permanently embedded in the sheet, there is no resistance to the extension of the rubber in any direction until the extension practically approaches the developed length of the individual threads of the helix. This condition is illustrated in Figs. 7 and 8. Therefore, although the sheet is free to expand in any direction, the full reenforcing effect of the embedded strands will be brought into play at any desired point in the percentage of elongation of the rubber sheet. Just when this restraint will be developed may be controlled by changing the pitch of the thread winding upon the rubber core.

The completed fabric may include a plurality of layers of fabric or of rubber, or both, if desired.

For many purposes, it is advantageous to provide the rubber sheet itself with perforations, as for ventilation and to permit transpiration from the body when the composite material is used in articles of clothing. It is preferred to form these perforations by a molding operation upon the rubber sheet while it is still uncured and in a plastic condition. The molding may conveniently be carried out simultaneously with the compositing of the two layers by appropriately shaping the pressure member which contacts the rubber web. In the machine of Fig. 4, the projections 23 on roll 15 mold and perforate the rubber sheet as it passes through the bite of the rolls. These projections may be arranged to form a pattern or design on the rubber side of the composite fabric and are preferably arranged to form the rubber sheet into a series of rib-like cross pieces 8, wider on the outer side of the rubber sheet to form tapering apertures 6 between the ribs. In the preferred embodiment, the projections are so spaced as to form not less than 100 apertures per square inch of the composite fabric.

In order to avoid tearing of the product, the elongation of the textile-wrapped threads when fully stretched should be less than the maximum elongation to be permitted in the rubber sheet. I have found that if the rubber is restrained from further stretch than 600% elongation, it most satisfactorily fulfills the great majority of needs. When the reenforcing thread system is in the form of a textile weave or knit which possesses stretchability because of the arrangement of the threads this natural stretchability must be taken into account in fixing the elongation permitted in the individual threads. Differences in the amount of this natural stretchability in different directions across the textile weave are compensated for by differences in the pitches of the wrapping upon the thread cores. For example, a larger pitch may be used in the warp threads than in the weft threads. When the composite fabric is subjected to stretch, it can stretch only so far as the total stretch of the reenforcing thread system. Thus, with a reenforcement according to this invention, a thinner layer of rubber may be used without danger of tearing in use, and practically nontearable products which can be stretched equally in all directions may be obtained.

It is understood that wherever herein the word "rubber" is used, it is to be construed to include rubber substitutes and other materials having similar physical properties.

I claim:

1. Extensible elastic sheet material equally extensible in all directions consisting of an elastic vulcanized rubber sheet and a ply of stretchable textile fabric integrally connected thereto, the threads of which are partially embedded in the rubber sheet and comprise an elastic rubber core and a relatively inextensible filament helically wrapped about the core, the rubber of the core being integrally united with the rubber of the sheet.

2. Extensible elastic foraminous laminated sheet material, equally extensible in all directions, consisting of an elastic vulcanized rubber sheet having on an average not less than 100 apertures per square inch of the sheet molded therein and a ply of stretchible, textile fabric integrally connected thereto, the threads of which are partially embedded in the rubber sheet and consist of an elastic rubber core and a relatively inextensible filament helically wrapped about the core, the rubber of the core being fused inseparably with the rubber of the sheet.

3. A composite structure comprising a sheet of elastic rubber and a reenforcing textile fabric, having threads comprising an elastic rubber core helically wrapped with a relatively inextensible textile filament, each turn of the wrapping being at least partially embedded in the rubber of the sheet and the core being integrally united with the rubber of the sheet.

4. The process of making an elastic composite foraminous sheet material which comprises providing a textile fabric the individual threads of which comprise plastic, unvulcanized rubber cores having helical filamentary wrappings, uniting the fabric with a sheet of unvulcanized rubber under heat and pressure sufficient to embed the threads of the textile fabric in the rubber of the sheet and to bring about union of the unvulcanized rubber of the core with the unvulcanized rubber of the sheet, and thereafter vulcanizing the rubber of the cores and sheet.

5. Extensible elastic formainous sheet material comprising an elastic vulcanized rubber sheet and a ply of stretchable textile fabric integrally connected thereto, the threads of which are partially embedded in the rubber sheet and comprise an elastic rubber core and a relatively inextensible filament helically wrapped about the core, the rubber of the core being integrally united with the rubber of the sheet.

6. Extensible elastic foraminous laminated sheet material comprising an elastic vulcanized rubber sheet having on an average not less than 100 apertures per square inch of the sheet molded therein and a ply of stretchable textile fabric integrally connected thereto, the threads of which are partially embedded in the rubber sheet and consist of an elastic rubber core and a relatively inextensible filament helically wrapped about the core, the rubber of the core being fused inseparably with the rubber of the sheet.

JOSEF A. GRABEC.